United States Patent
Chia et al.

(10) Patent No.: US 8,879,188 B1
(45) Date of Patent: Nov. 4, 2014

(54) DISK DRIVE EMPLOYING FLY HEIGHT CALIBRATION TRACKS TO ACCOUNT FOR MAGNETIC ENTROPY AND THERMAL DECAY

(75) Inventors: Galvin T. Chia, Rancho Santa Margarita, CA (US); Noureddine Kermiche, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 587 days.

(21) Appl. No.: 13/158,087

(22) Filed: Jun. 10, 2011

Related U.S. Application Data

(60) Provisional application No. 61/376,009, filed on Aug. 23, 2010.

(51) Int. Cl.
*G11B 5/60* (2006.01)

(52) U.S. Cl.
CPC .................................. *G11B 5/6029* (2013.01)
USPC .................................. 360/55; 360/31; 360/75

(58) Field of Classification Search
None
See application file for complete search history.

(56) References Cited

U.S. PATENT DOCUMENTS

| | | | |
|---|---|---|---|
| 5,377,058 A | 12/1994 | Good et al. | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,147,488 A | 11/2000 | Bamba et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |

(Continued)

FOREIGN PATENT DOCUMENTS

| | | |
|---|---|---|
| JP | 2007179723 A | 7/2007 |
| JP | 2007293948 A | 11/2007 |

OTHER PUBLICATIONS

Tsai et al, "Configurable NAND Flash Translation Layer", Proceedings of the IEEE International Conference on Sensor Networks, Ubiquitous, and Trustworthy Computing (SUTC'06), Jun. 5-7, 2006, 8 pages.

(Continued)

*Primary Examiner* — Wayne Young
*Assistant Examiner* — James L Habermehl

(57) ABSTRACT

A disk drive is disclosed comprising a head actuated over a disk comprising a plurality of tracks including a first fly height calibration track and a second fly height calibration track. The disk drive further comprises a fly height actuator operable to control a fly height of the head in response to a fly height control signal. When a refresh event is detected, calibration data is written to the second fly height calibration track. After writing calibration data to the second fly height calibration track, the first fly height calibration track is read in order to calibrate the fly height control signal applied to the fly height actuator. After calibrating the fly height control signal, the second fly height calibration track is read in order to recalibrate the fly height control signal applied to the fly height actuator.

20 Claims, 6 Drawing Sheets

(56) References Cited

U.S. PATENT DOCUMENTS

| | | |
|---|---|---|
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,266,199 B1 | 7/2001 | Gillis et al. |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,307,817 B1 | 10/2001 | Tsuboi |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,393,511 B1 | 5/2002 | Albrecht et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,501,606 B2 | 12/2002 | Boutaghou et al. |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,570,378 B2 | 5/2003 | Goh et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,617 B1 | 8/2003 | Cross |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,630,824 B2 | 10/2003 | Richter |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,203 B1 | 2/2004 | Cheng et al. |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,714,368 B1 | 3/2004 | Himle et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,033 B2 | 5/2005 | Weinstein et al. |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |

(56) References Cited

U.S. PATENT DOCUMENTS

| | | |
|---|---|---|
| 6,983,316 B1 | 1/2006 | Milne et al. |
| 6,986,007 B1 | 1/2006 | Procyk et al. |
| 6,986,154 B1 | 1/2006 | Price et al. |
| 6,987,630 B1 | 1/2006 | Higgins et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,016,131 B2 | 3/2006 | Liu et al. |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,038,875 B2 | 5/2006 | Lou et al. |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,068,449 B2 | 6/2006 | Riddering et al. |
| 7,068,451 B1 | 6/2006 | Wang et al. |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,180,692 B1 | 2/2007 | Che et al. |
| 7,194,576 B1 | 3/2007 | Boyle |
| 7,196,860 B2 | 3/2007 | Alex |
| 7,200,698 B1 | 4/2007 | Rothberg |
| 7,205,805 B1 | 4/2007 | Bennett |
| 7,206,497 B1 | 4/2007 | Boyle et al. |
| 7,209,304 B2 | 4/2007 | Seng et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,253,984 B1 | 8/2007 | Patapoutian et al. |
| 7,263,709 B1 | 8/2007 | Krapf |
| 7,265,933 B1 | 9/2007 | Phan et al. |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,324,299 B1 | 1/2008 | Schreck et al. |
| 7,325,244 B2 | 1/2008 | Boyle et al. |
| 7,330,323 B1 | 2/2008 | Singh et al. |
| 7,330,324 B2 | 2/2008 | Morinaga et al. |
| 7,333,290 B1 | 2/2008 | Kupferman |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,408,731 B2 | 8/2008 | Uemura et al. |
| 7,415,571 B1 | 8/2008 | Hanan |
| 7,423,830 B2 | 9/2008 | Ma et al. |
| 7,426,090 B2 | 9/2008 | Yamashita et al. |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,468,854 B2 | 12/2008 | Yamashita et al. |
| 7,471,483 B1 | 12/2008 | Ferris et al. |
| 7,471,486 B1 | 12/2008 | Coker et al. |
| 7,477,465 B2 | 1/2009 | Yu |
| 7,483,234 B2 | 1/2009 | Shimozato |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,715,135 B1 | 5/2010 | Sutardja et al. |
| 7,719,781 B2 | 5/2010 | Ehrlich et al. |
| 7,719,785 B2 | 5/2010 | Taniguchi et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,738,206 B1 * | 6/2010 | Lin et al. .................. 360/31 |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,817,372 B2 | 10/2010 | Takahashi |
| 7,827,320 B1 | 11/2010 | Stevens |
| 7,830,632 B2 | 11/2010 | Tang et al. |
| 7,835,104 B2 | 11/2010 | Yamashita et al. |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,880,992 B2 | 2/2011 | Ozturk et al. |
| 7,889,448 B2 | 2/2011 | Lu |
| 7,898,756 B1 | 3/2011 | Wang |
| 7,898,762 B1 | 3/2011 | Guo et al. |
| 7,900,037 B1 | 3/2011 | Fallone et al. |

(56) References Cited

U.S. PATENT DOCUMENTS

| | | |
|---|---|---|
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,948,704 B2 | 5/2011 | Ellis |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,986,487 B1 | 7/2011 | Madden et al. |
| 7,990,648 B1 | 8/2011 | Wang |
| 7,992,179 B1 | 8/2011 | Kapner, III et al. |
| 7,995,304 B2 | 8/2011 | Ozturk et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,054,573 B2 | 11/2011 | Mathew et al. |
| 8,068,299 B2 | 11/2011 | Tsunokawa et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,098,451 B2 | 1/2012 | Graef |
| 8,116,020 B1 | 2/2012 | Lee |
| 8,116,025 B1 | 2/2012 | Chan et al. |
| 8,125,723 B1 | 2/2012 | Nichols et al. |
| 8,125,724 B1 | 2/2012 | Nichols et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,307 B2 | 3/2012 | Kim et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,169,726 B2 | 5/2012 | Wilson |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,454 B1 | 6/2013 | Katchmart |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Pruett et al. |
| 8,756,382 B1 | 6/2014 | Carlson et al. |
| 2002/0062470 A1 | 5/2002 | Yang et al. |
| 2002/0063559 A1 | 5/2002 | Richter |
| 2003/0016461 A1 | 1/2003 | Seng et al. |
| 2003/0043491 A1 | 3/2003 | Riddering et al. |

(56) References Cited

U.S. PATENT DOCUMENTS

| | | |
|---|---|---|
| 2003/0067697 A1 | 4/2003 | Weinstein et al. |
| 2003/0132747 A1 | 7/2003 | Hong et al. |
| 2007/0174582 A1 | 7/2007 | Feldman |
| 2007/0268615 A1 | 11/2007 | McFadyen et al. |
| 2008/0130159 A1 | 6/2008 | Dieron et al. |
| 2008/0165443 A1 | 7/2008 | Moline |
| 2008/0165446 A1 | 7/2008 | Partee |
| 2008/0310043 A1 | 12/2008 | Masuda et al. |
| 2009/0113702 A1 | 5/2009 | Hogg |
| 2009/0153996 A1 | 6/2009 | Ellis |
| 2009/0195902 A1 | 8/2009 | Moser et al. |
| 2009/0195912 A1 | 8/2009 | Sato |
| 2009/0213486 A1 | 8/2009 | Takahashi |
| 2010/0128386 A1 | 5/2010 | Keizer et al. |
| 2010/0306551 A1 | 12/2010 | Meyer et al. |
| 2011/0075292 A1 | 3/2011 | New et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

OTHER PUBLICATIONS

Seagate Banded Device Feature Set, Slide Presentation F11131, Seagate, Aug. 16, 2011, 16 pages.

* cited by examiner

| GUARD BAND |
| 1ST FH CALIBRATION TRACK |
| GUARD BAND |
| 2ND FH CALIBRATION TRACK |
| GUARD BAND |

//

DISK DRIVE EMPLOYING FLY HEIGHT CALIBRATION TRACKS TO ACCOUNT FOR MAGNETIC ENTROPY AND THERMAL DECAY

CROSS-REFERENCE TO RELATED APPLICATIONS

The present application claims priority from provisional U.S. Patent Application Ser. No. 61/376,009, filed on Aug. 23, 2010, the specification of which is incorporated herein by reference.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

The hysteresis of the magnetic grains is not permanent meaning that over time the grains will orientate into random directions (magnetic entropy) until the magnetic field is no longer sensed reliably (leading to data errors during reproduction). Magnetic entropy may also be precipitated by various factors, such as increasing ambient temperature. That is, at higher temperatures the uniform alignment of the grains will degrade faster. Another factor that precipitates magnetic entropy is a phenomenon referred to as adjacent track interference (ATI) wherein when writing data to a target track, the fringe field from the write element degrades the uniform alignment of the grains recorded in an adjacent track. The fringe field from the write element may also adversely affect a wider range of tracks with respect to the written track, a phenomena referred to as wide area track erasure or WATER. The degrading effect of ATI on the adjacent tracks as well as WATER on the near adjacent tracks compounds over time with each write operation to the target track. Eventually, the magnetic field emanating from the disk surface will deteriorate to the point that the data is no longer recoverable.

FIG. 1 shows a prior art disk format 2 comprising a number of data tracks 4 defined by concentric servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

DETAILED DESCRIPTION OF EMBODIMENTS OF THE INVENTION

Figure 2A:
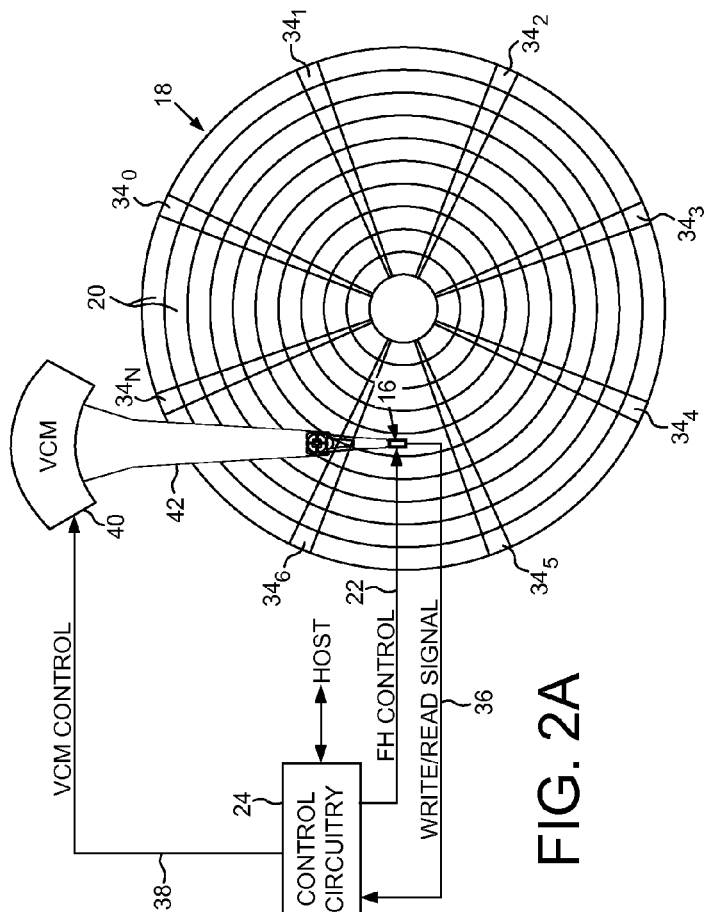
FIG. 2A shows a disk drive according to an embodiment of the present invention comprising a head actuated over a disk, a fly height actuator, and control circuitry.
Figure 2B:
FIG. 2B shows an embodiment of the present invention wherein the disk comprises a first fly height calibration track and a second fly height calibration track.
Figure 2C:
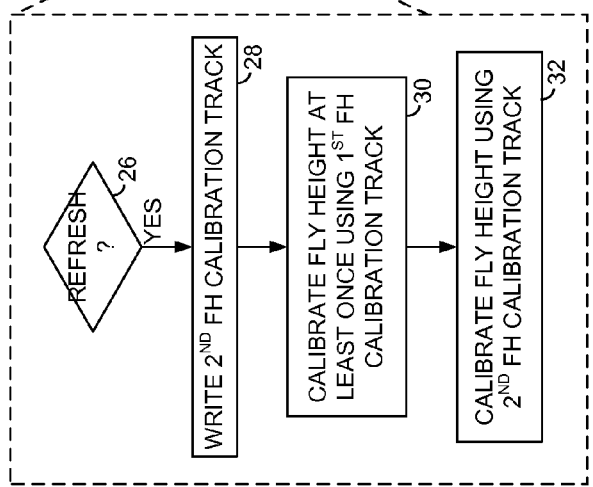
FIG. 2C is a flow diagram according to an embodiment of the present invention wherein when a refresh event is detected, calibration data is written to a second fly height calibration track after which a first calibration track is used to calibrate a fly height control signal at least once before using the second fly height calibration track to calibrate the fly height control signal.

FIG. 2A shows a disk drive according to an embodiment of the present invention comprising a head 16 actuated over a disk 18 comprising a plurality of tracks 20 including a first fly height calibration track and a second fly height calibration track (FIG. 2B). The disk drive further comprises a fly height actuator operable to control a fly height of the head 16 in response to a fly height control signal 22, and control circuitry 24 operable to execute the flow diagram of FIG. 2C. When a refresh event is detected (step 26), calibration data is written to the second fly height calibration track (step 28). After writing calibration data to the second fly height calibration track, the first fly height calibration track is read in order to calibrate the fly height control signal applied to the fly height actuator (step 30). After calibrating the fly height control signal, the second fly height calibration track is read in order to recalibrate the fly height control signal applied to the fly height actuator (step 32).

The disk 18 shown in the embodiment of FIG. 2A comprises a plurality of servo sectors $34_0$-$34_N$ that define the tracks 20. The control circuitry 24 processes a read signal 36 emanating from the head 16 to demodulate the servo sectors $34_0$-$34_N$ into a position error signal (PES) representing a position error of the head relative to a target data track. The control circuitry 24 comprises a servo compensator for filtering the PES to generate a control signal 38 applied to a voice coil motor (VCM) 40 that rotates an actuator arm 42 about a pivot in order to actuate the head 16 radially over the disk 18 in a direction that reduces the PES.

Any suitable fly height actuator may be employed, such as a heater which controls fly height through thermal expansion, or a piezoelectric (PZT) actuator integrated with the head 16. In one embodiment, an operating fly height control signal used during normal operation of the disk drive is determined by decreasing the fly height of the head 16 (by adjusting the fly height control signal 22) until the head 16 contacts the disk 18 (touchdown). The operating fly height control signal may then be determined, for example, relative to the fly height control signal applied to the fly height actuator that causes the touchdown. In one embodiment, the operating fly height control signal is determined by backing off the fly height control signal that causes the touchdown. In another embodiment, a suitable technique may be employed to measure the fly height of the head 16 relative to when the touchdown is detected, and then select the operating fly height control signal that achieves a target fly height. For example, the fly height control signal applied to the fly height actuator is correlated with the measured fly height based on when touchdown is detected so that an operating fly height control signal can be selected that will achieve a target fly height.

During the touchdown operation, the touchdown of the head may be detected in any suitable manner. In one embodiment, a microactuator may be integrated with the head (e.g., in a gimbal that couples a read/write element to a slider), or integrated with a suspension that couples a gimbal to the actuator arm 42, or mounted on the actuator arm 42, etc. The microactuator may be dedicated for detecting head touchdown, or it may also be used to actuate the head over the disk in fine movements during normal operation. Other embodiments may detect head touchdown by evaluating a temperature signal generated by a temperature sensor integrated with the head, wherein when head touchdown occurs, the temperature signal will exceed a threshold. Other techniques for detecting head touchdown include evaluating the amplitude of the read signal (e.g., when reading the servo bursts), evaluating the PES for serving the head, and/or evaluating a servo wedge-to-wedge timing, all of which may be affected by head touchdown.

After executing the touchdown operation in order to initialize the operating fly height control signal 22, a fly height calibration track is read in order to initialize a fly height reference that corresponds to the initial operating fly height control signal. Over time, it may be necessary to recalibrate the operating fly height control signal in order to adjust the operating fly height of the head 16 to compensate for fly height deviation due, for example, to changing environmental conditions (e.g., temperature or pressure), or to changes in the response of the fly height actuator. The operating fly height control signal may be recalibrated in response to any suitable event, such as over a periodic interval, or if a touchdown of the head is detected during normal operation, or if an environmental sensor detects a change in an environmental condition that affects the fly height (e.g., a change in temperature or pressure). In order to recalibrate the operating fly height control signal, the fly height calibration track is read to estimate the fly height of the head relative to the fly height reference calibrated after the touchdown operation. However, the fly height calibration track may degrade over time due, for example, to general magnetic entropy or to magnetic interference from write operations of near adjacent tracks.

Degradation of the fly height calibration track can be overcome by refreshing the track (rewriting the calibration data). However, after rewriting the fly height calibration track the calibration data will begin to degrade immediately due to thermal decay which induces error in the measured fly height until the thermal decay settles out. To compensate for this thermal decay, in one embodiment of the present invention at least two fly height calibration tracks are employed (FIG. 2B). When the first calibration track begins to degrade significantly (due to magnetic entropy or interference from writes to near adjacent tracks), the second fly height calibration track is refreshed while continuing to use the first calibration track to perform fly height calibration. After the thermal decay interval associated with refreshing the second fly height calibration track, the fly height calibration process switches from the first to the second fly height calibration track. A similar process is then repeated when the second fly height calibration track degrades significantly, that is, the first fly height calibration track is refreshed and then the fly height calibration process switches to using the first fly height calibration track after the thermal decay interval.

Figure 3A:
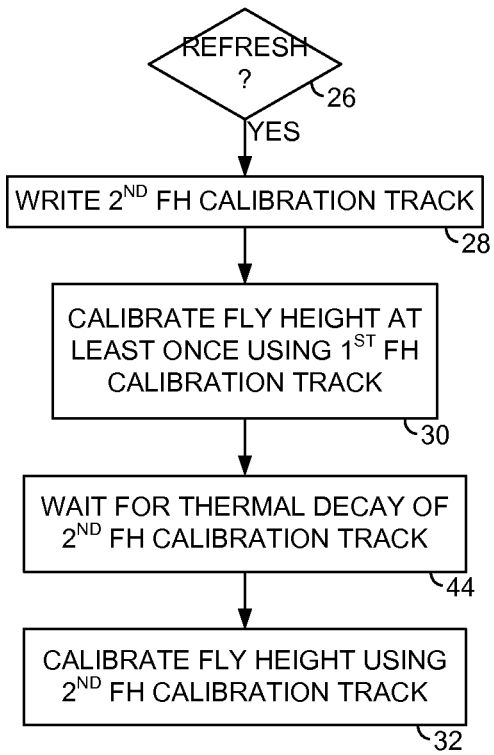
FIG. 3A is a flow diagram according to an embodiment of the present invention wherein after writing calibration data to the second fly height calibration track, using the second fly height calibration track is delayed for a period of time to account for thermal decay.

This embodiment is understood with reference to the flow diagram of FIG. 3A wherein the fly height calibration is initially configured to use the first fly height calibration track. When a refresh event is detected (step 26), the second fly height calibration track is refreshed by writing calibration data to the track (step 28). The refresh event may be detected in any suitable manner, such as by detecting the expiration of a refresh interval. In another embodiment, the refresh event is detected when degradation of the first fly height calibration track is detected. The degradation may be detected in any suitable manner, such as by detecting performance degradation of the disk drive (e.g., increased error rate or degrading channel metrics) after calibrating the fly height control signal. After refreshing the second fly height calibration track (step 28), the first fly height calibration track is used to calibrate the fly height control signal at least once (step 30) while waiting for the thermal decay to settle out for the second fly height calibration track (step 44). The fly height calibration process then switches to using the second fly height calibration track before the first fly height calibration track degrades too much (step 32).

Figure 3B:
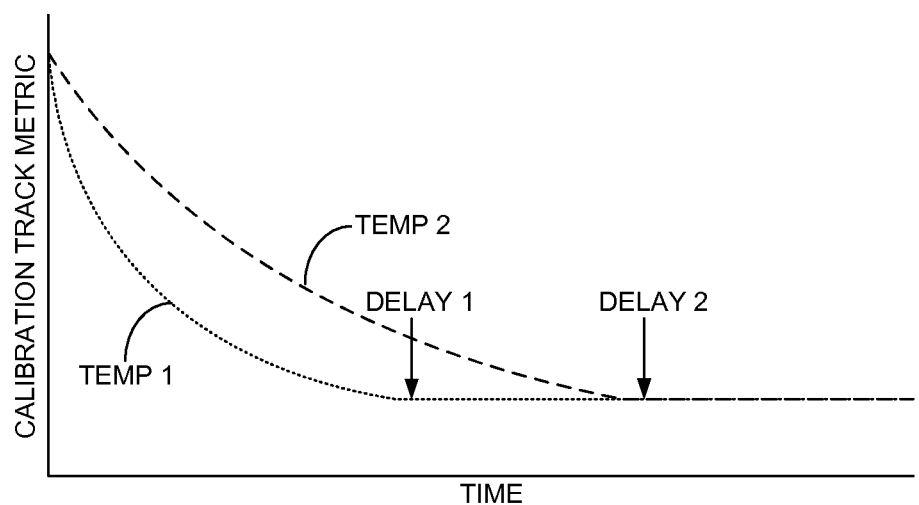
FIG. 3B shows an embodiment of the present invention showing that the thermal decay may vary based on an ambient temperature of the disk drive.
Figure 3C:
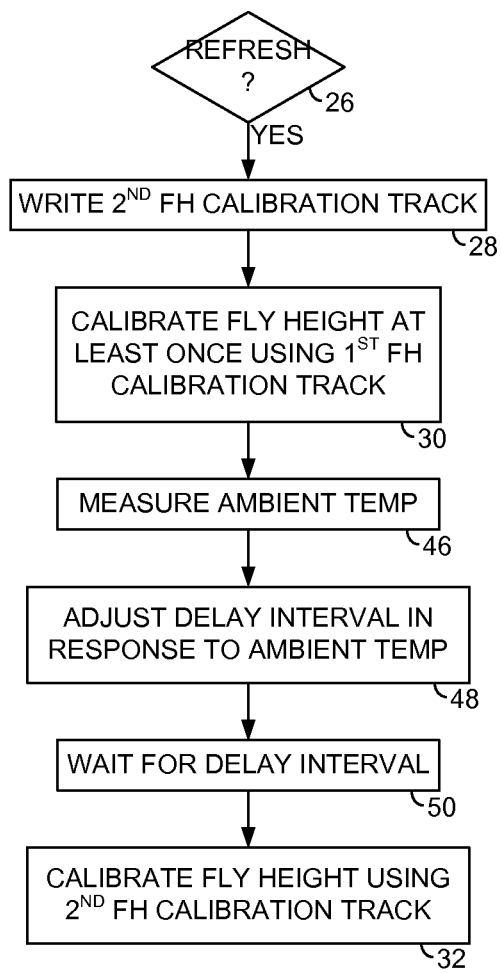
FIG. 3C is a flow diagram according to an embodiment of the present invention wherein the delay interval before using the second fly height calibration track is adjusted based on a measured ambient temperature of the disk drive.

FIG. 3B illustrates an embodiment of the present invention wherein the thermal decay interval after refreshing the fly height calibration track may vary based on the ambient temperature of the disk drive. In one embodiment shown in the flow diagram of FIG. 3C, after refreshing the second fly height calibration track (step 28) the ambient temperature of the disk drive is measured (step 46) and the delay interval corresponding to the expected thermal decay is adjusted based on the measured ambient temperature (step 48). After waiting for the adjusted delay interval (step 50), the fly height calibration process switches to using the second fly height calibration track (step 32).

Figure 1:
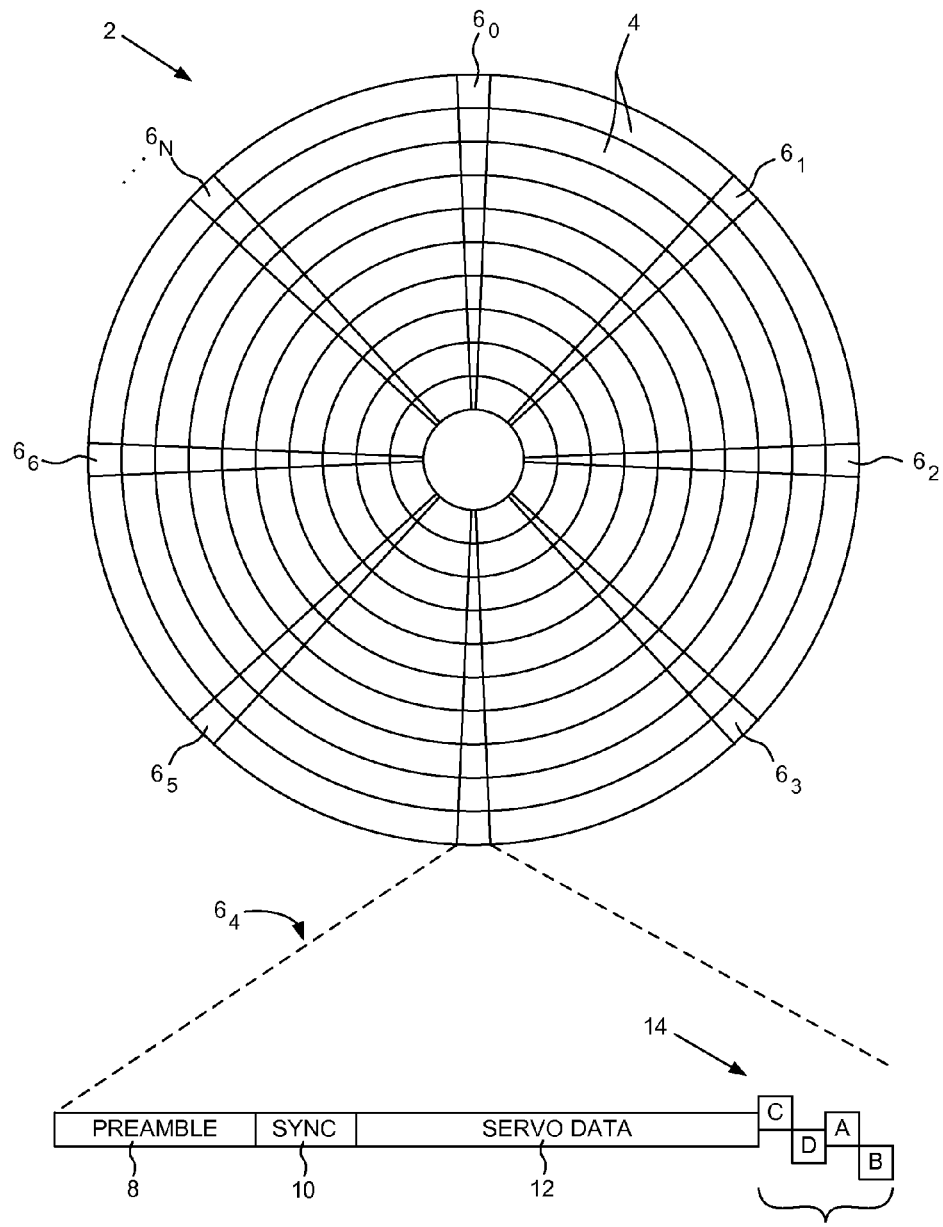
FIG. 1 shows a prior art disk format comprising a plurality of servo sectors that define a plurality of tracks.

Any suitable technique may be employed to estimate the fly height by reading the fly height calibration track, including to generate a fly height estimate representing the fly height reference after executing the touchdown operation. In one embodiment, the fly height estimate is generated using a harmonic ratio (HR) method. After writing an NT pattern (e.g., 2T pattern) to the fly height calibration track, a fly height estimate is generated by reading the fly height calibration track and measuring an amplitude of the read signal at a first harmonic ($V_A$) and at a second harmonic ($V_B$). A log of the ratio ($V_A/V_B$) is then multiplied by ($\lambda/4\pi$), where $\lambda$ is the frequency of the NT read signal in the spatial domain (i.e., velocity/write_frequency). In one embodiment, the first harmonic is the fundamental harmonic of the NT read signal, and the second harmonic is the third harmonic of the NT read signal. The NT pattern may be written in the user data area between the servo sectors (FIG. 1A) and the HR fly height estimate generated at any suitable resolution (e.g., once per data sector).

Figure 4:
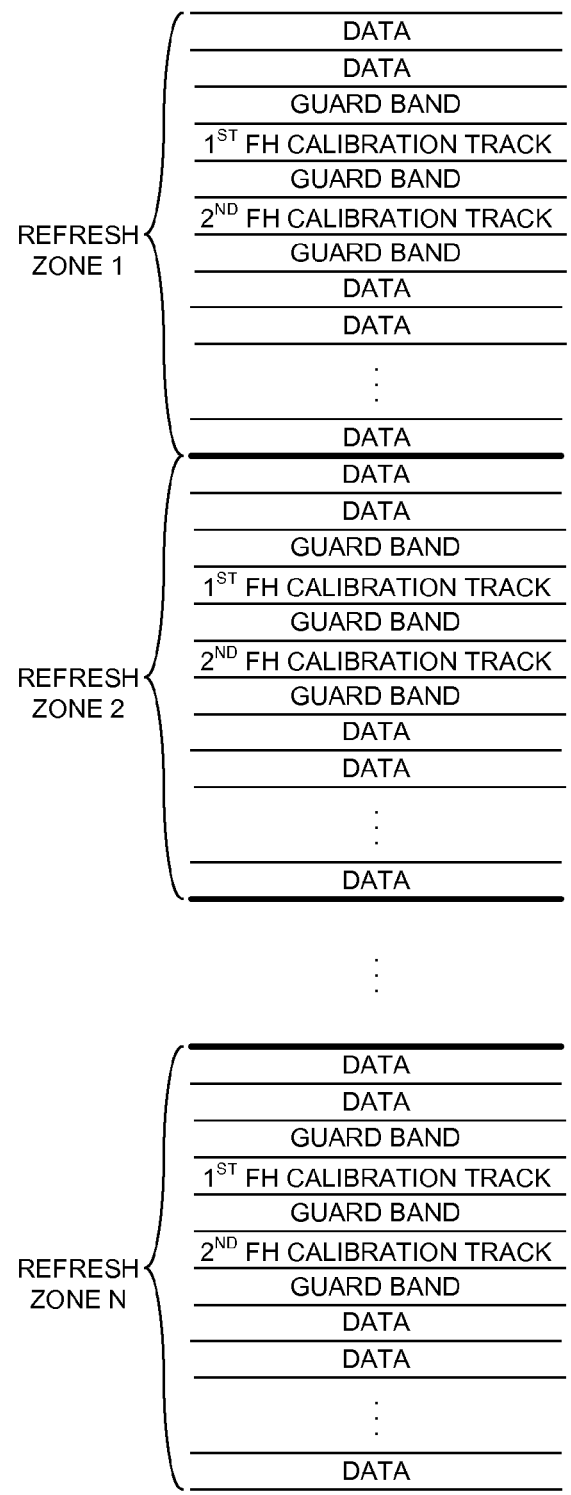
FIG. 4 shows an embodiment of the present invention wherein a plurality of refresh zones are defined on the disk, and each refresh zone comprises first and second fly height calibration tracks.

FIG. 4 shows an embodiment of the present invention wherein a plurality of refresh zones are defined on the disk, and each refresh zone comprises a plurality of tracks including first and second fly height calibration tracks. The data recorded in the tracks will degrade over time due to magnetic entropy and interference from writes to adjacent and near adjacent tracks. To compensate for this degradation, the control circuitry refreshes the data in each refresh zone when needed, for example, after a refresh interval and/or after the number of write operations in a refresh zone exceeds a threshold. Prior to refreshing one of the refresh zones, calibration data is written to the second fly height calibration track so that the second fly height calibration track can be used to calibrate the fly height control signal prior to refreshing the zone.

Figure 5:
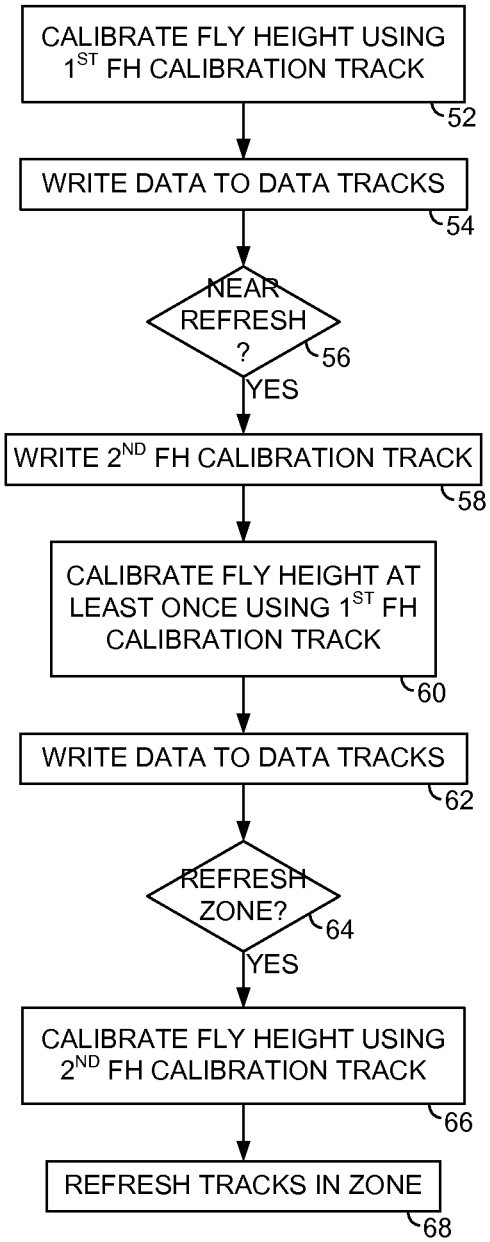
FIG. 5 is a flow diagram according to an embodiment of the present invention wherein prior to refreshing a refresh zone, calibration data is written to the second fly height calibration track.

This embodiment is understood with reference to the flow diagram of FIG. 5 wherein the fly height control signal is calibrated using the first fly height calibration track (step 52). Data is written to the tracks of the refresh zones (step 54), and when one of the refresh zones nears a refresh event (step 56), calibration data is written to the second fly height calibration track (step 58). The fly height calibration process continues to use the first fly height calibration track (step 60) in order to write data to the refresh zone (step 62) during the thermal decay interval. When the refresh zone is ready to be refreshed (step 64), the fly height control signal is calibrated using the second fly height calibration track (step 66) and the refresh zone is refreshed (step 68).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk comprising a plurality of tracks including a first fly height calibration track and a second fly height calibration track;
a head actuated over the disk;
a fly height actuator operable to control a fly height of the head in response to a fly height control signal; and
control circuitry operable to:
when a refresh event is detected, write calibration data to the second fly height calibration track;
after writing calibration data to the second fly height calibration track, read the first fly height calibration track in order to calibrate the fly height control signal applied to the fly height actuator; and
after calibrating the fly height control signal, read the second fly height calibration track in order to recalibrate the fly height control signal applied to the fly height actuator.

2. The disk drive as recited in claim 1, wherein the control circuitry is further operable to detect the refresh event by detecting a degradation of calibration data recorded in the first fly height calibration track.

3. The disk drive as recited in claim 1, wherein the disk further comprises guard band tracks adjacent at least one of the first and second fly height calibration tracks.

4. The disk drive as recited in claim 1, wherein prior to reading the second fly height calibration track the control circuitry is further operable to wait for a delay interval corresponding to a thermal decay of the second fly height calibration track.

5. The disk drive as recited in claim 4, wherein the control circuitry is further operable to:
measure an ambient temperature; and
adjust the delay interval based on the measured ambient temperature.

6. The disk drive as recited in claim 1, wherein:
the control circuitry is further operable to define a plurality of refresh zones, wherein each refresh zone comprises a plurality of tracks;
each refresh zone comprises first and second fly height calibration tracks; and
the control circuitry is further operable to refresh data recorded in the tracks of a refresh zone by reading and rewriting the data.

7. The disk drive as recited in claim 6, wherein the control circuitry is further operable to write the calibration data to the second fly height calibration track of a first refresh zone prior to refreshing the first refresh zone.

8. The disk drive as recited in claim 7, wherein after writing the calibration data to the second fly height calibration track, the control circuitry is further operable to wait for a delay interval prior to refreshing the first refresh zone.

9. The disk drive as recited in claim 8, wherein the delay interval corresponds to a thermal decay of the second fly height calibration track.

10. The disk drive as recited in claim 8, wherein after the delay interval the control circuitry is further operable to read the second fly height calibration track in order to calibrate the second control signal applied to the fly height actuator.

11. A method of operating a disk drive comprising a head actuated over a disk comprising a plurality of tracks including a first fly height calibration track and a second fly height calibration track, and a fly height actuator operable to control a fly height of the head in response to a fly height control signal, the method comprising:

when a refresh event is detected, writing calibration data to the second fly height calibration track;

after writing calibration data to the second fly height calibration track, reading the first fly height calibration track in order to calibrate the fly height control signal applied to the fly height actuator; and after calibrating the fly height control signal, reading the second fly height calibration track in order to recalibrate the fly height control signal applied to the fly height actuator.

12. The method as recited in claim 11, further comprising detecting the refresh event by detecting a degradation of calibration data recorded in the first fly height calibration track.

13. The method as recited in claim 11, wherein the disk further comprises guard band tracks adjacent at least one of the first and second fly height calibration tracks.

14. The method as recited in claim 11, wherein prior to reading the second fly height calibration track the method further comprises waiting for a delay interval corresponding to a thermal decay of the second fly height calibration track.

15. The method as recited in claim 14, further comprising:
measuring an ambient temperature; and
adjusting the delay interval based on the measured ambient temperature.

16. The method as recited in claim 11, wherein:
the method further comprises defining a plurality of refresh zones, wherein each refresh zone comprises a plurality of tracks;
each refresh zone comprises first and second fly height calibration tracks; and
the method further comprises refreshing data recorded in the tracks of a refresh zone by reading and rewriting the data.

17. The method as recited in claim 16, further comprising writing the calibration data to the second fly height calibration track of a first refresh zone prior to refreshing the first refresh zone.

18. The method as recited in claim 17, wherein after writing the calibration data to the second fly height calibration track, the method further comprises waiting for a delay interval prior to refreshing the first refresh zone.

19. The method as recited in claim 18, wherein the delay interval corresponds to a thermal decay of the second fly height calibration track.

20. The method as recited in claim 18, wherein after the delay interval the method further comprises reading the second fly height calibration track in order to calibrate the second control signal applied to the fly height actuator.

* * * * *